(12) United States Patent
Karri et al.

(10) Patent No.: US 12,147,840 B2
(45) Date of Patent: Nov. 19, 2024

(54) USING A MACHINE LEARNING MODULE TO DETERMINE A GROUP OF EXECUTION PATHS OF PROGRAM CODE AND A COMPUTATIONAL RESOURCE ALLOCATION TO USE TO EXECUTE THE GROUP OF EXECUTION PATHS

(71) Applicant: International Business Machines Corporation, Armonk, NY (US)

(72) Inventors: Venkata Vara Prasad Karri, Visakhapatnam (IN); Sri Harsha Varada, Vizianagaram (IN); Sarbajit K. Rakshit, Kolkata (IN); Tirumala Vasu Padisetti, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 17/467,136

(22) Filed: Sep. 3, 2021

(65) Prior Publication Data

US 2023/0071278 A1 Mar. 9, 2023

(51) Int. Cl.
G06F 9/46 (2006.01)
G06F 9/50 (2006.01)
G06N 20/00 (2019.01)

(52) U.S. Cl.
CPC ............ *G06F 9/505* (2013.01); *G06F 9/5055* (2013.01); *G06N 20/00* (2019.01)

(58) Field of Classification Search
CPC ..................................................... G06F 9/505
(Continued)

(56) References Cited

U.S. PATENT DOCUMENTS 6,934,951 B2 * 8/2005 Wilkinson, III .... G06F 15/8053
712/228
9,705,747 B1 * 7/2017 Xue ...................... H04L 45/125
(Continued)

FOREIGN PATENT DOCUMENTS

AU 2016202814 A1 3/2017
CN 107995039 A 5/2018
(Continued)

OTHER PUBLICATIONS

PCT International Search Report and Written Opinion, dated Nov. 28, 2022, 10pp., for International Application No. PCT/CN2022/115443.

(Continued)

*Primary Examiner* — Mehran Kamran
(74) *Attorney, Agent, or Firm* — Konrad, Raynes, Davda & Victor LLP; David W. Victor (57) ABSTRACT

Provided are computer program product, system, and method for using a machine learning module to determine a group of execution paths of program code and a computational resource allocation to use to execute the group of execution paths. Information on activity steps in program code and a system load of a system in which the program code is executed are provided as inputs to a resource allocation machine learning module. The resource allocation machine learning module processes the provided inputs to output computational resource allocations for execution paths of activity steps in the program code to execute in parallel, including memory and processing resource allocations optimized according to an optimization criteria. The outputted computational resource allocations are allocated to execute the activity steps in the execution paths in parallel.

19 Claims, 5 Drawing Sheets

(58) Field of Classification Search
USPC .......................................................... 718/104
See application file for complete search history.

(56) References Cited

U.S. PATENT DOCUMENTS

| | | | | |
|---|---|---|---|---|
| 10,855,808 | B1* | 12/2020 | Mohanty | H04L 47/125 |
| 11,200,514 | B1* | 12/2021 | Chen | G06N 20/00 |
| 11,635,993 | B2* | 4/2023 | Vadapandeshwara | G06F 9/5044 |
| | | | | 718/104 |
| 2009/0158289 | A1* | 6/2009 | Toub | G06F 9/5038 |
| | | | | 718/104 |
| 2012/0159507 | A1* | 6/2012 | Kwon | G06F 9/5088 |
| | | | | 718/104 |
| 2014/0055496 | A1* | 2/2014 | Cunningham | G06F 16/2471 |
| | | | | 345/660 |
| 2015/0236896 | A1* | 8/2015 | Brown | H04L 41/0654 |
| | | | | 709/201 |
| 2015/0277965 | A1* | 10/2015 | Bradshaw | G06F 9/466 |
| | | | | 718/101 |
| 2016/0062800 | A1* | 3/2016 | Stanfill | G06F 9/5038 |
| | | | | 718/104 |
| 2018/0081720 | A1* | 3/2018 | Zlatanchev | G06F 9/4887 |
| 2018/0089002 | A1* | 3/2018 | Xia | G06F 1/324 |
| 2019/0108055 | A1* | 4/2019 | Anand | G06N 5/02 |
| 2019/0196939 | A1* | 6/2019 | Lengauer | G06F 11/3006 |
| 2020/0026633 | A1* | 1/2020 | Gottin | G06F 11/3423 |
| 2020/0042216 | A1* | 2/2020 | Zhang | G06N 3/105 |
| 2020/0057675 | A1* | 2/2020 | Dias | G06F 9/5061 |
| 2020/0133859 | A1* | 4/2020 | Gottin | G06F 12/0806 |
| 2020/0234115 | A1* | 7/2020 | Pourghassemi | G06F 17/15 |
| 2020/0272444 | A1* | 8/2020 | Nilsen | G06F 8/4441 |
| 2020/0334083 | A1* | 10/2020 | Liu | G06F 8/45 |
| 2021/0042577 | A1* | 2/2021 | Martin | G06V 10/82 |
| 2021/0126986 | A1* | 4/2021 | Rolf | H04L 67/52 |
| 2021/0349814 | A1* | 11/2021 | Joshi | G06F 11/3688 |
| 2022/0121194 | A1* | 4/2022 | Pritchard | G06N 20/20 |
| 2022/0138616 | A1* | 5/2022 | Patel | G06F 16/288 |
| | | | | 706/12 |
| 2022/0198320 | A1* | 6/2022 | Walczyk, III | G06F 18/23 |
| 2022/0350708 | A1* | 11/2022 | Vishwakarma | G06F 11/1458 |
| 2023/0071278 | A1* | 3/2023 | Karri | G06N 20/00 |
| 2023/0105476 | A1* | 4/2023 | Anil | G06N 3/006 |
| | | | | 718/102 |

FOREIGN PATENT DOCUMENTS

| | | |
|---|---|---|
| CN | 109144716 A | 1/2019 |
| CN | 109840248 A | 6/2019 |
| CN | 112306653 A | 2/2021 |
| CN | 113157421 A | 7/2021 |

OTHER PUBLICATIONS

Emerald Works Limited, "Critical Path Analysis and PERT Charts", [online], [Retrieved on Aug. 1, 2021], Retrieved from the Internet at <URL: https://www.mindtools.com/pages/article/critical-path-analysis.htm>, 5 pp.

Fields, B.A., "Using Criticality to Attack Performance Bottlenecks", Technical Report No. UCB/EECS-2006-176, [online], Dec. 14, 2006, Retrieved from the Internet at URL <http://www.eecs.berkeley.edu/Pubs/TechRpts/2006/EECS-2006-176.html>, 224 pp.

Widmer, S., et al., "Fast Dynamic Memory Allocator for Massively Parallel Architectures", Proceedings of the 6th Workshop on General Purpose Processor Using Graphics Processing Units, Mar. 16, 2013, 7 pp.

Witt, C., et a;., "Predictive Performance Modeling for Distributed Computing Using Black-Box Monitoring and Machine Learning", arXiv:1805.11877, May 30, 2018, 19 pp.

* cited by examiner

| Record ID | Program Code | Inputs to Resource Allocation MLM | Selected Group of Execution Paths | Estimated Times to Execute Selected Group of Execution Paths | Processor/Memory Resource Allocations for Selected Group of Execution Paths | Realized Times to Execute Execution Paths | Confidence Levels for Execution Paths in Selected Group |
|---|---|---|---|---|---|---|---|
| 301 | 302 | 304 | 306 | 308 | 310 | 312 | 314 |

Historical Allocation Information

USING A MACHINE LEARNING MODULE TO DETERMINE A GROUP OF EXECUTION PATHS OF PROGRAM CODE AND A COMPUTATIONAL RESOURCE ALLOCATION TO USE TO EXECUTE THE GROUP OF EXECUTION PATHS

BACKGROUND OF THE INVENTION

1. Field of the Invention

The present invention relates to a computer program product, system, and method for using a machine learning module to determine a group of execution paths of program code and a computational resource allocation to use to execute the group of execution paths.

2. Description of the Related Art

A program is comprised of multiple activity steps that may be arranged in different execution paths to execute in parallel to reduce execution time. An activity step comprises a group of computer operations that perform an activity as part of the program code operations. The time required to complete processing an execution path depends on the processor and memory resources assigned to execute the activity steps in the execution path. Increasing the amount of processor and memory resources assigned to an execution path reduces the execution time. Likewise decreasing processor and memory resource increases the time to execute the execution path.

Different activity steps in a workflow or sequence of activity steps take different amounts of time to complete and have different complexities. A critical execution path comprises a sequency of activity steps that require the longest duration to execute of the different parallel execution paths. In this way, the bottleneck in completing processing the activity steps comprises the critical execution path that takes the longest time to execute. A greater amount of processor and memory resources may be assigned to the critical path in the workflow to reduce the overall execution time of the execution paths executed in parallel and improve the overall performance in completing execution of the activity steps of the program code.

There is a need in the art for improved techniques to determine execution paths of activity steps in program code and the computational resources to assign to the execution paths to optimize the execution of the program code.

SUMMARY

Provided are computer program product, system, and method for using a machine learning module to determine a group of execution paths of program code and a computational resource allocation to use to execute the group of execution paths. Information on activity steps in program code and a system load of a system in which the program code is executed are provided as inputs to a resource allocation machine learning module. The resource allocation machine learning module processes the provided inputs to output computational resource allocations for execution paths of activity steps in the program code to execute in parallel, including memory and processing resource allocations optimized according to an optimization criteria. The outputted computational resource allocations are allocated to execute the activity steps in the execution paths in parallel.

DETAILED DESCRIPTION

Described embodiments provide improvements to computer technology to select a group of execution paths of activity steps in program code of different multiple possible groups of execution paths in which the activity steps may be arranged and processor/memory allocations of resources for the selected group of execution paths. Described embodiments utilize a resource allocation machine learning module that receives as input the activity steps and a system load and processes that information to select a group of execution paths and determine the processor/memory allocation of resources to process the selected group according to an optimization criteria. The optimization criteria may seek to minimize execution time or minimize the amount of computational resources to allocate to process the execution paths within required available times to execute the activity steps.

Further described embodiments provide improvements to computer technology to train the resource allocation machine learning module to adjust the processor/memory resource allocations based on an extent to which the realized time to process the execution paths of activity steps with the determined processor/memory resource allocations is within an acceptable margin of error of an estimated time to process the activity steps.

Figure 1:
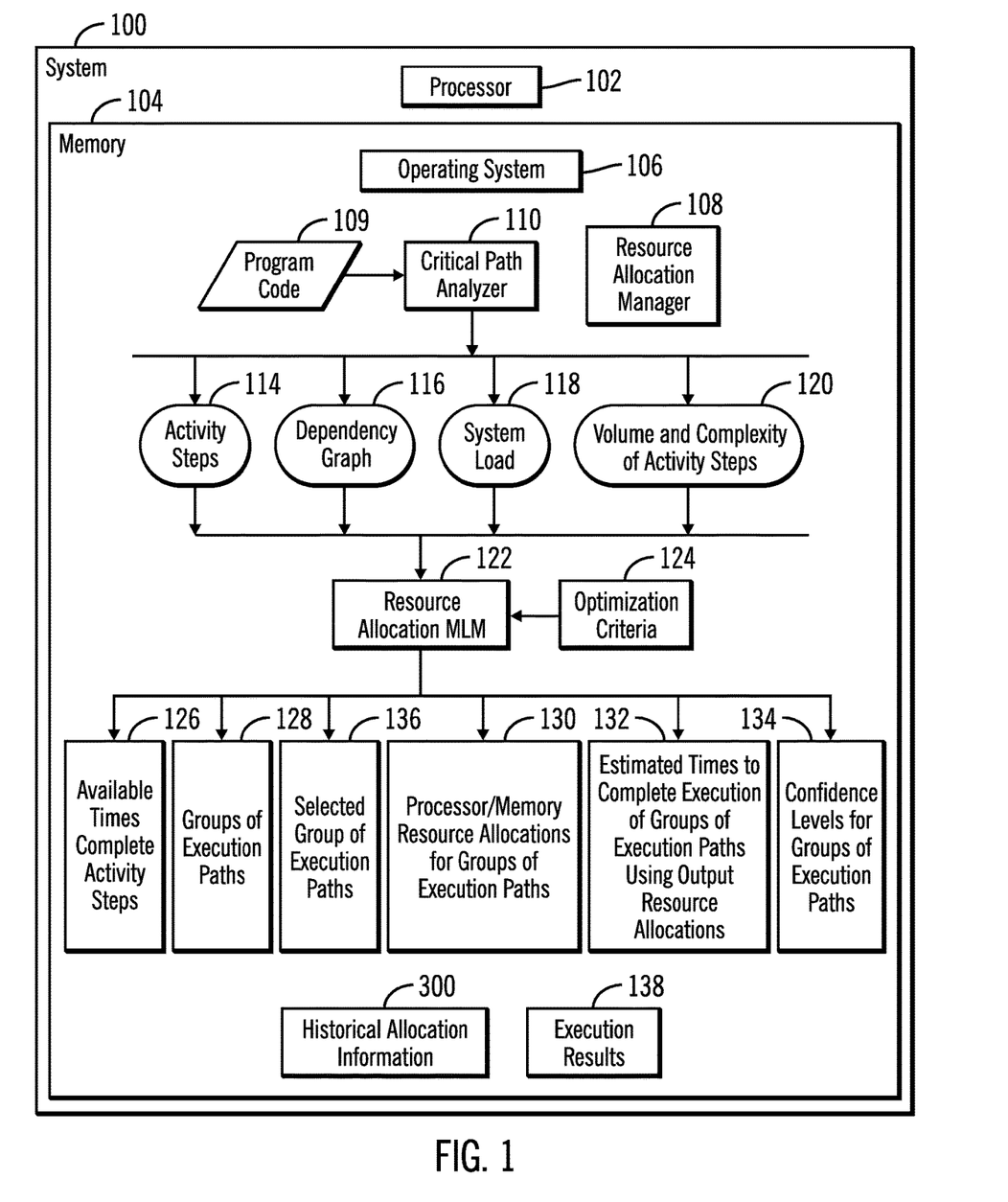
FIG. 1 illustrates an embodiment of a computing environment to assign computational resources to execution paths of activity steps in program code.

FIG. 1 illustrates an embodiment of a system 100 in which embodiments are implemented. The system 100 includes a processor 102 and a main memory 104. The main memory 104 includes various program components including an operating system 106; a resource allocation manager 108 to manage overall resource allocation operations in the system 100; program code 109 having activity steps that are processed in required sequences; a critical path analyzer 112 to determine activity steps 114 in the program code 109, a dependency graph 116 of required sequences in which the activity steps must be processed, system load 118 of a system to execute the program code 109, such as system 100 or another system, and volume and complexity of activity steps 120. The system load 118 may include current used memory and processor resources in the system to execute the program code 109, available memory and processor resources in the system, current number of users, current data access rates in the system to execute the program code 109.

A resource allocation machine learning module ("MLM") 122, which may be in the main memory 104 or implemented in separate hardware or memory device, receives as input the activity steps 114, dependency graph 116, system load 118, and volume and complexity of the activity steps 120 and uses machine learning and artificial intelligence to output, based on the inputs 114, 116, 118, and 120 and an optimization criteria 124: available times to complete activity steps 126, groups of execution paths 128, wherein the execution paths in different of the groups include different arrangements of the activity steps, including divisions of activity steps, wherein the execution paths in a group can be processed in parallel; processor/memory resource allocations 130 for the groups of execution paths 128; estimated times 132 to complete execution of the groups of execution paths 132 using the outputted resource allocation 130; a selected group of execution paths 136, which may optimize the selection of processor/memory, e.g., computational, resource allocations and estimated time to complete execution based on the optimization criteria 124; and confidence levels 134 for the groups of execution paths 128. The confidence level 134 for a particular group of execution paths indicates a likelihood that the estimated time 132 to complete execution of the particular group of execution paths and a realized time are within an acceptable margin of error, i.e., sufficiently similar.

The optimization criteria 124 may be used by the resource allocation MLM 122 to select the selected group 136. One optimization criteria may select the selected group 136 that has a lowest estimated time to complete execution of the groups 128 using less than a maximum allowed amount of available system resources indicated in the input system load 118. Another optimization criteria may determine the selected group 136 that has a lowest allocation of computational resources, e.g., processor and memory resources, of the computational resources 130 allocated of the groups that is estimated to complete execution within an available time 126 required to complete execution of the activity steps in the critical path bottleneck execution path in the selected group 136.

In an alternative embodiment, available times to complete activity steps 126, the groups of execution paths 128, and estimated times to complete execution of the groups 132 may be determined by the critical path analyzer 110 and then inputted into the resource allocation MLM 122 to determine the outputs 136, 130, 132, 134.

Figure 3:
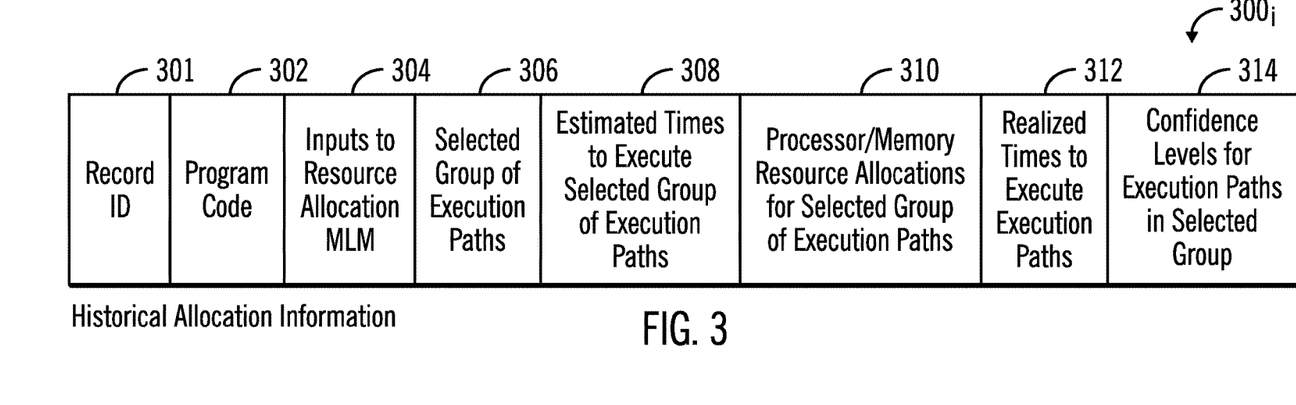
FIG. 3 illustrates an embodiment of historical allocation information on the processor/memory resources allocated to a selected group of execution paths to execute and a realized time for execution of the parallel executed execution paths.

Upon receiving execution results 138 including a realized time to execute the selected group of execution paths 136, the resource allocation manager 108 may generate historical allocation information 300 having information on the inputs 113, 116, 118, 120, the outputs 126, 128, 136, 130, 132, 134, and the realized time to execute the selected group 136 of execution paths. The historical allocation information 300 may be used by the resource allocation manager 108 to train the resource allocation MLM 122 to increase or lower the confidence level produced for the inputs and outputs based on whether the realized and estimated times are sufficiently close or similar.

In certain embodiments, the resource allocation MLM 122 may use machine learning and deep learning algorithms, such as decision tree learning, association rule learning, neural network, inductive programming logic, support vector machines, Bayesian network, etc. For artificial neural network program implementations, the neural network may be trained using backward propagation to adjust weights and biases at nodes in a hidden layer to produce the computed output. In backward propagation used to train a neural network machine learning module, biases at nodes in the hidden layer are adjusted accordingly to produce the output 126-136 with a specified confidence level based on the input parameters 114-120. Backward propagation may comprise an algorithm for supervised learning of artificial neural networks using gradient descent. Given an artificial neural network and an error function, the method may calculate the gradient of the error function with respect to the neural network's weights and biases.

In backward propagation used to train a neural network machine learning module, such as the resource allocation MLM 122, a margin of errors is determined based on a difference of the estimated time to complete execution of execution paths in the selected group 136 and the realized time to complete execution in the execution results 138. This information on whether output selected group 136 optimizes execution of the activity steps 114 based on the optimization criteria 124 may be used to modify the confidence level 134 for the selected group of execution paths 136 based on various inputs 114-120. Biases at nodes in the hidden layer are adjusted accordingly to decrease the confidence level for the selected group 136 based on an extent the realized times to execute the execution paths in the selected group 136 using the allocated resources 130 exceed the estimated times 132, i.e., the resource allocation 130 failed to meet expectations, and increase the confidence level of the selected group 136 based on an extent the realized times to execute the execution paths in the selected group 136 using the allocated resources 130 fell below the estimated time 132, i.e., the resource allocation exceeded expectations.

In an alternative embodiment, the resource allocation engine 122 may be implemented not as a machine learning module, but implemented using a rules based system to determine the outputs from the inputs.

The arrows shown in FIG. 1 between the components and objects in the memory 104 represent a data flow between the components.

Generally, program modules, such as the program components 106, 108, 110, and 122 may comprise routines, programs, objects, components, logic, data structures, and so on that perform particular tasks or implement particular abstract data types. The program components and hardware devices of the system 100 of FIG. 1 may be implemented in one or more computer systems, where if they are implemented in multiple computer systems, then the computer systems may communicate over a network.

The program components 106, 108, 110, and 122 may be accessed by the processor 102 from the memory 104 to execute. Alternatively, some or all of the program components 106, 108, 110, and 122 may be implemented in separate hardware devices, such as Application Specific Integrated Circuit (ASIC) hardware devices.

The functions described as performed by the programs 106, 108, 110, and 122 may be implemented as program code in fewer program modules than shown or implemented as program code throughout a greater number of program modules than shown.

The memory 104 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

Figure 2A:
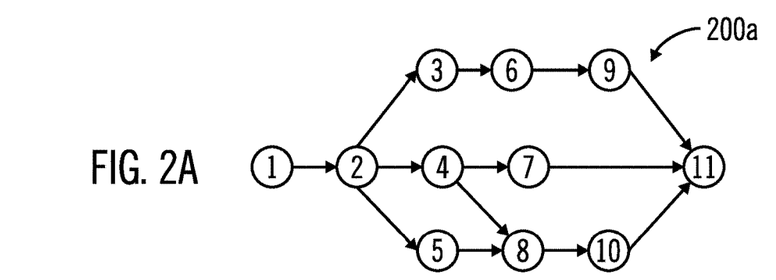
FIGS. 2a and 2b illustrate examples of how activity steps of a program may be arranged in execution paths.
Figure 2B:
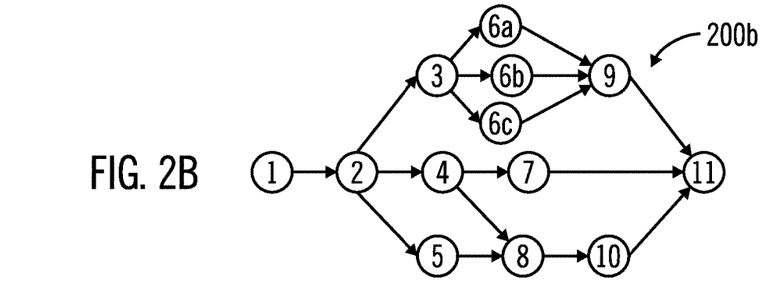

FIGS. 2a and 2b illustrate examples of groups 200a, 200b of execution paths including activity steps, numbered 1 through 11, in program code 109, where a critical path would be the path of activity steps taking the most time to complete. FIG. 2a shows three execution paths of 1-3-6-9, 1-2-4-7-11, and 1-5-8-10-11. FIG. 2b shows the activity step 6 divided into three sub-activity steps 6a, 6b, 6c, that may be processed in parallel to allow faster processing of activity step 6. Thus, if the critical path comprising the bottleneck was path 1-3-6-9, then the group of execution paths 200b would provide a faster processing time by providing for faster processing of activity step 6 as parallel sub-activity steps 6a, 6b, 6c. In this way, one activity step may be split into multiple sub-activity steps and accordingly appropriate memory will be allocated to reduce a critical path bottleneck.

FIG. 3 illustrates an embodiment of an instance of historical allocation information $300_i$ for the results of a selected group of execution paths and the execution thereof, including: a record identifier 301, program code 302 comprising the program code 109 that was optimized; the inputs 304 to the resource allocation MLM 122, such as 114, 116, 118, and 120; the resulting selected group of execution paths 306, such as output 136; estimated times to execute the selected group of execution paths 308, such as output 132; the determined processor/memory resource allocations for the selected group of execution paths 310, such as output 130; the realized times to execute the execution paths 312, such as reported realized times 138; and the confidence level for the selected group 314, such as output 134.

The historical allocation information $300_i$, comprising the inputs to the resource allocation MLM 122, outputs, and realized times to execute the execution paths in the selected group 136 with the determined resource allocations, may be used to retrain the resource allocation MLM 122 based on the difference of the estimated times 308 and realized times 312 to minimize the error in the computational resource allocations.

Figure 4:
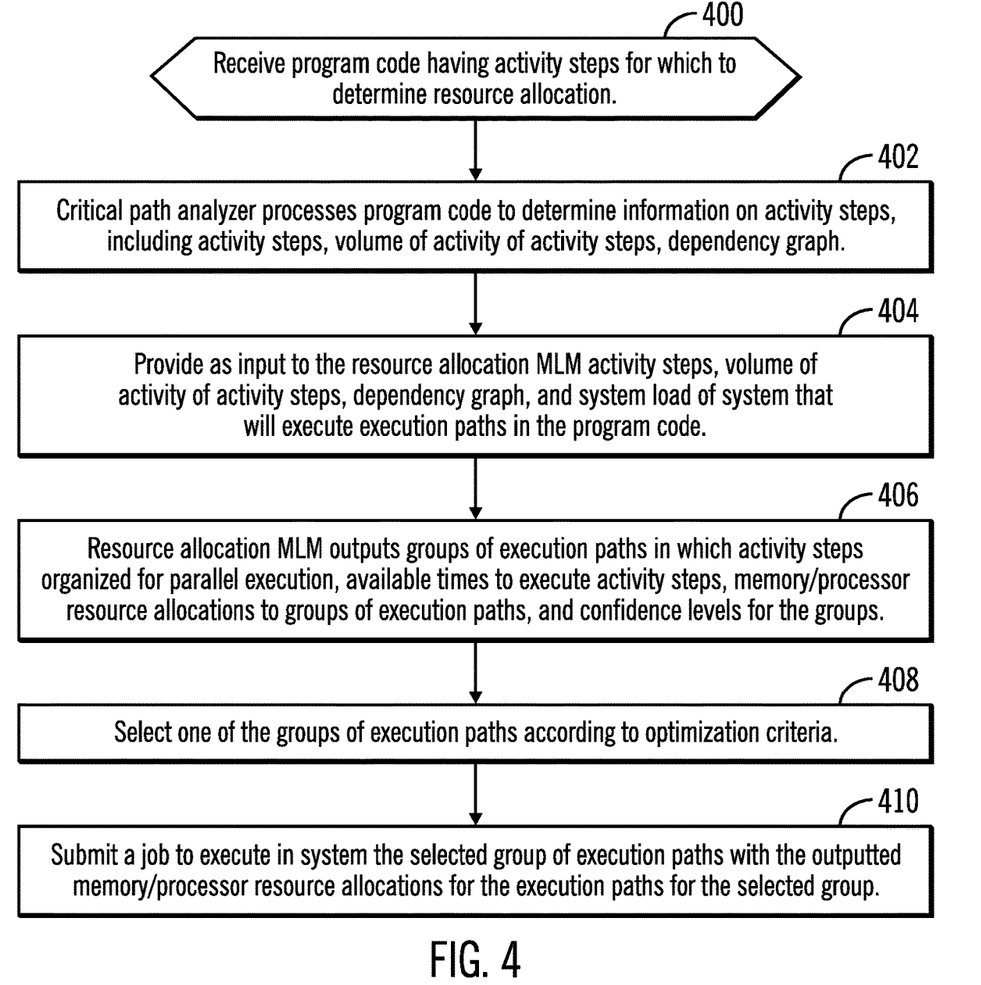
FIG. 4 illustrates an embodiment of operations to select a group of execution paths of activity steps for a program and computational resources to allocate to execute the selected group of execution paths.

FIG. 4 illustrates an embodiment of operations performed by the resource allocation manager 108, critical path analyzer 110, and resource allocation MLM 122 to determine a processor/memory resource allocation 130 to use to process execution paths in program code 109. Upon receiving (at block 400) program code 109 having activity steps 114 for which the resource allocation 130 is to be determined, the resource allocation manager 108 invokes (at block 402) the critical path analyzer 110 to processes the program code 109 to determine information on activity steps, including the activity steps 114 in the program code 109, volume of activity of activity steps 120, a dependency graph 116, and a system load 118 of the system to execute the program code 109. The resource allocation manager 108 may provide (at block 404) the determined information 114, 120, 116, and 118 as input to the resource allocation MLM 122. The resource allocation MLM 122 outputs (at block 406) groups of execution paths 128 in which activity steps are organized for parallel execution, available times to execute activity steps 126, processor/memory resource allocations 130 for the groups of execution paths 128, and confidence levels 134 for the groups 128 indicating a likelihood/probability the processor/memory resource allocation 130 will result in a realized execution time or realized time sufficiently close to the estimated time. Activity steps in an execution path may be divided into multiple sub-activity steps to allow parallel processing of a single activity step. From this output, the resource allocation MLM 122 selects (at block 408) one of the groups of execution paths 128 according to the optimization criteria 124.

For instance, if the optimization criteria 124 is to minimize execution time, then the resource allocation MLM 122 selects the group 136 of execution paths from the groups 128 that completes execution in a minimum time. If the optimization criteria 124 is to minimize processor/memory resource allocation 130 to conserve computational resources, then the resource allocation MLM 122 selects the group 136 of execution paths from the groups 128 that minimizes the processor/memory resource allocation 130 and completes execution of the activity steps in the required available times 126 for the activity steps 114. Other optimization criteria 124 may also be used.

After selecting the group 136 of execution paths to execute, the resource allocation manager 108 submits (at block 410) a job to execute, in the system 100 or another system, the selected group 136 of execution paths with the outputted processor/memory resource allocations 130 for the execution paths for the selected group.

With the embodiment of FIG. 4, machine learning may be used to determine resource allocations 130 for different groups, i.e., arrangements, of activity steps 114 in execution paths and then select one of the groups 136 whose execution with the determined processor/memory resource allocation for the groups will satisfy an optimization criteria 124.

With the embodiment of operations of FIG. 4, machine learning and artificial intelligence may analyze volume and complexity 120 of the activity steps 114 in any activity workflow and predict the critical path bottleneck in the computation so that appropriate computational resource allocation can be planned for each and every activity step to ensure the activity steps complete within the required available times 126 for the activity steps 114 and satisfy an optimization criteria 124 in terms of minimizing processor/memory allocation or minimizing time to complete execution of the activity steps 114. The resource allocation MLM 122 may predict available times 126 to complete the activity steps 114 in the workflow sequence to allocate the minimal amount of processor/memory resource allocations 130 so the system executing the program code 109 completes execution of the activity steps 114 within the available times 126.

Further, the resource allocation MLM 122 may dynamically arrange the activities, and split one activity step into multiple sub-activity steps if necessary, to allow for parallel or sequential processing to complete execution of the activity steps 114 within the required available times 126.

In the embodiments of FIGS. 1 and 4, inputs 114, 116, 118, and 120 are described as determined by the critical path analyzer 110. In alternative embodiments, some of these inputs may be determined by the resource allocation MLM 122. In the described embodiments of FIGS. 1 and 4, certain of the outputs 126, 128 are described as determined by the resource allocation MLM 122. In an alternative embodiment, some of these outputs 126, 128 may be determined by the critical path analyzer 110.

Figure 5:
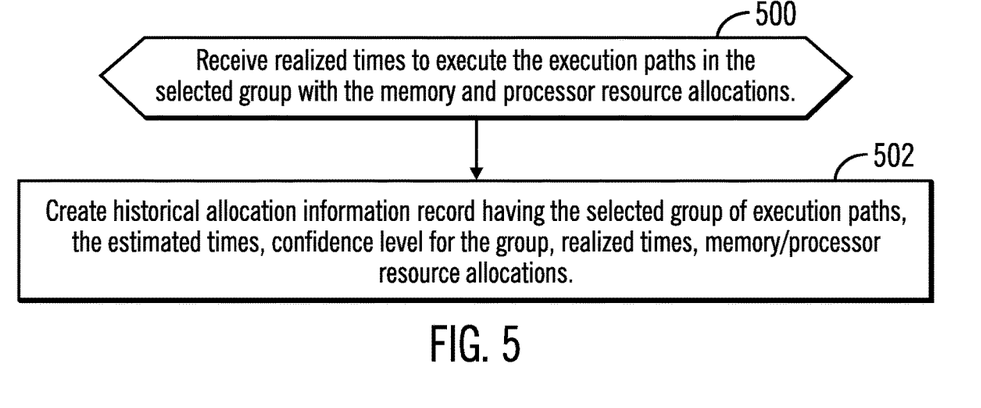
FIG. 5 illustrates an embodiment of operations to generate historical allocation information for execution of the activity steps of program code.

FIG. 5 illustrates an embodiment of operations performed by the resource allocation manager 108 to create the historical allocation information 300k. Upon receiving (at block 500) realized times in execution results 138 for executing the selected group of execution paths 136 with the processor/memory allocations for the selected group 136, the resource allocation manager 108 creates (at block 502) the historical allocation information record 300$_i$ having the selected group of execution paths 306, the estimated times 308 to execute the execution paths in the selected group 306, realized times to execute the execution paths in the selected group 306 using the processor/memory resource allocations 310, and confidence levels for the selected group 314 indicating a likelihood using the processor/memory resource allocations 310 results in a realized time to execute the selected group 306 meeting the estimated times 308 to execute the selected group 306, and the estimated times 308 are the times that resulted in optimization according to the optimization criteria 124.

In one embodiment, there may be an estimated time 132, 308, processor/memory resource allocations 130, 310, realized time 312 and confidence level 134, 314 for each execution path in the selected group 128, 306. In an alternative embodiment, there may be one estimated time 132, 308, realized time 312 and confidence level 314 for all the execution paths in the selected group 306, where there may be different processor/memory resource allocations for the different execution paths.

With the embodiment of operations of FIG. 5, the resource allocation manager 108 gathers various parameters (e.g., computation complexities, volume of activity, etc.) related to each and every activity step and associated memory requirements, time required to complete, etc., and creates a knowledge corpus to allocate appropriate memory for any activity step to complete in a timely fashion within the determined available times 126 to execute the activity steps 114.

Figure 6:
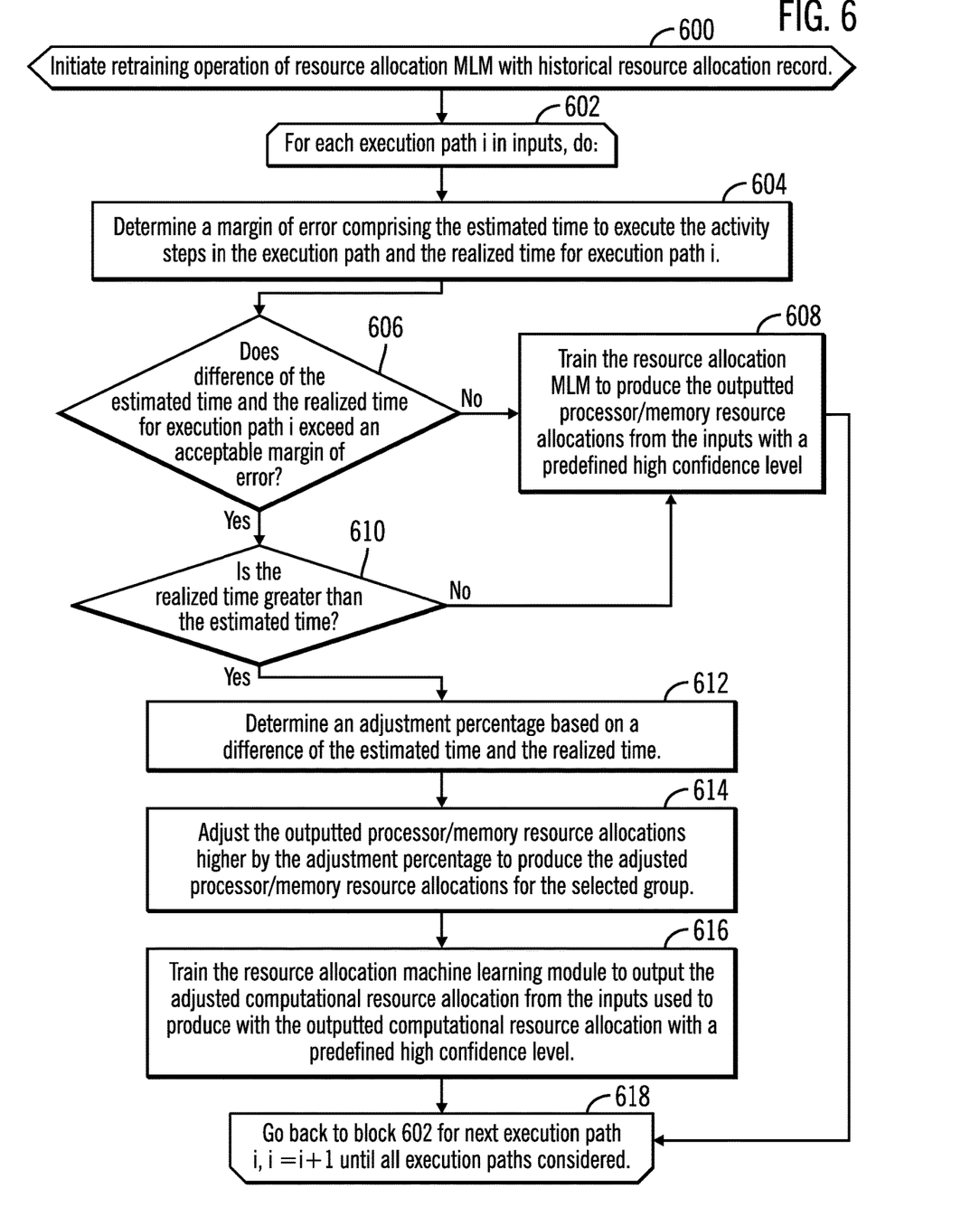
FIG. 6 illustrates an embodiment of operations to train a resource allocation machine learning module to optimize the output of computational resources to allocate to execute selected execution paths in program code.

FIG. 6 illustrates an embodiment of operations performed by the resource allocation manager 108 and resource allocation MLM 122 to retrain the resource allocation MLM 122 with an historical resource allocation record 300$_i$ to minimize errors in determining the selected group 136 and processor/memory resource allocations 130 to satisfy the optimization criteria 124. Upon initiating (at block 600) the retraining operation, a loop of operations is performed at blocks 602 through 618 for each execution path i in the selected group 306 of execution paths. The resource allocation manager 108 determines (at block 604) a margin of error comprising the estimated time 308 to execute the activity steps in the execution path i and the realized time 312 for execution path i. If (at block 606) the difference of the estimated time 308 and the realized time 312 for execution path i falls within an acceptable margin of error, then the resource allocation MLM 122 is trained (at block 608) to produce the processor/memory resource allocations 310 from the inputs 304 with a predefined high confidence level. In neural network implementations of the resource allocation MLM 122, biases at nodes in a hidden layer are adjusted to increase the confidence level to the predefined high confidence level for the selected group 136.

If (at block 606) the difference of the estimated time 308 and the realized time 312 for execution path i exceeds the acceptable margin of error, and if (at block 610) the realized time 312 is less than the estimated time 308, i.e., the performance exceeded expectations for the execution path i, then control proceeds to block 608 to train the resource allocation MLM 122 to produce the determined resource allocation 310 with a high confidence level. If (at block 610) the realized time 312 is greater than the estimated time 308, i.e., realized performance fell below expectations, then the resource allocation manager 108 or other component determines (at block 612) an adjustment percentage based on a difference of the estimated time 308 and the realized time 312 for the execution path i. The outputted processor/memory resource allocations 310 is adjusted (at block 614) higher by the adjustment percentage to produce the adjusted processor/memory resource allocations. The resource allocation MLM 122 is trained (at block 616) to output the adjusted computational resource allocation from the inputs used to produce with the outputted computational resource allocation with a predefined high confidence level. Control then proceeds to block 618 where the loop of operations at blocks 60-2 through 618 are performed for further of the non-critical and critical execution paths.

With the embodiment of FIG. 6, the resource allocation MLM 122 is continually retrained to adjust the confidence levels higher to favor outputting processor/memory resource allocations for a selected group that when used results in a realized time to execute the selected group of execution paths within the estimated time and reduce the confidence levels for those outputted processor/memory resource allocations that results in a realized time that is greater than the estimated time by an acceptable margin of error.

In the embodiment of FIG. 6, there is an estimated time 132, 308, processor/memory resource allocations 130, 310, realized time 312 and confidence level 134, 314 for each execution path in the selected group 128, 306 to train the resource allocation MLM 122 for the performance on each execution path in the selected group. In an alternative embodiment, there may be one estimated time 132, 308, realized time 312 and confidence level 314 for all the execution paths in the selected group 306, such that the resource allocation MLM 122 is retrained once based on the difference of the realized time and estimated for execution of all the execution paths to adjust the one confidence level 314 for execution of all paths in the selected group 306.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
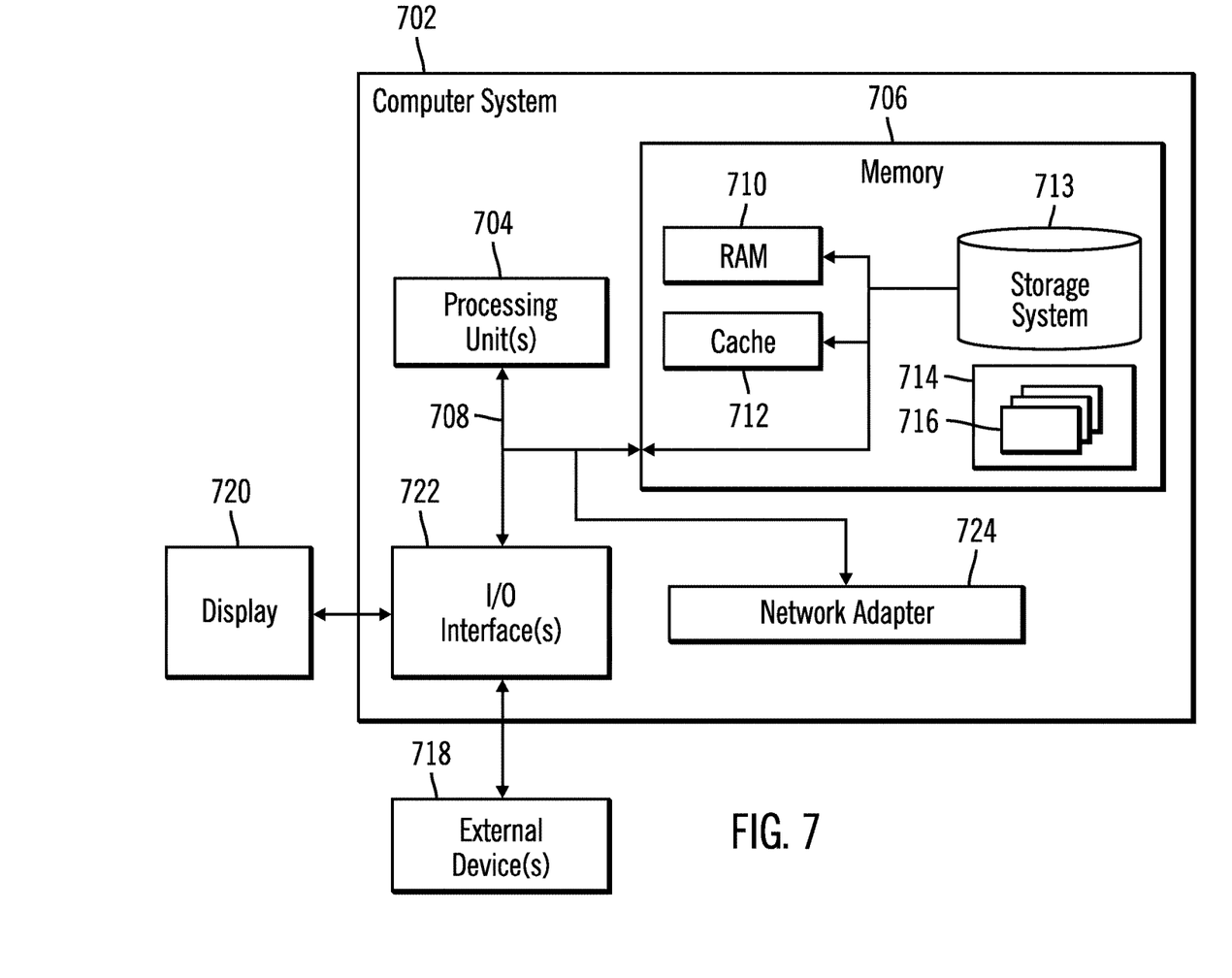
FIG. 7 illustrates a computing environment in which the components of FIG. 1 may be implemented.

The computational components of FIG. 1, including the system 100, may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712.

Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for assigning resources to execution paths in a program, wherein the computer program product comprises a computer readable storage medium having program instructions embodied therewith that when executed cause operations, the operations comprising:

determining execution paths of activity steps in program code to execute in parallel and estimated times to complete execution of the execution paths;

providing, as inputs to a resource allocation machine learning module, information on the activity steps in the program code, the determined execution paths and the estimated times to complete execution of the execution paths, and a current system load of a system in which the program code is executed, wherein the current system load comprises current used memory and processor resources in the system;

processing, by the resource allocation machine learning module, the provided inputs to output computational resource allocations for execution paths of activity steps in the program code to execute in parallel, wherein the output computational resource allocations comprise memory and processor resource allocations optimized according to an optimization criteria; and allocating the outputted computational resource allocations, including the memory and processor resource allocations, to execute the activity steps in the execution paths in parallel.

2. The computer program product of claim 1, wherein the operations further comprise:
   determining, by the resource allocation machine learning module, groups of execution paths, wherein the execution paths in different of the groups include different arrangements of the activity steps, wherein the execution paths in the groups can be processed in parallel;
   determining, by the resource allocation machine learning module, available times in which to complete execution of the execution paths;
   determining, by the resource allocation machine learning module, estimated times to complete execution of the execution paths in the groups; and
   determining, by the resource allocation machine learning module, a selected group of the groups of execution paths to which resource allocation will apply.

3. The computer program product of claim 2, wherein the selected group comprises the group of execution paths that is optimized according to an optimization criteria comprising one of: (1) that the selected group has a lowest estimated time to complete execution of the groups of execution paths using less than a maximum allowed amount of available system resources and (2) that the selected group has a lowest allocation of computational resources of computational resources allocated for the groups of execution paths that is estimated to complete execution within an available time.

4. The computer program product of claim 1, wherein different computational resource allocations are outputted for different of the execution paths, and wherein a critical execution path comprising one of the execution paths that that takes longest to complete is allocated more computational resources than other of the execution paths to minimize a bottleneck of the critical execution path.

5. The computer program product of claim 1, wherein the information on the activity steps further includes at least one of computational complexities of the activity steps, volume of activity created by the activity steps, and a dependency graph indicating activity steps whose execution is dependent on execution of other activity steps, and wherein the current system load includes at least one of current used memory and processor resources in the system, available memory and processor resources in the system, current number of users in the system, and current data access rates in the system.

6. The computer program product of claim 1, wherein the operations further comprise:
   determining an adjusted computational resource allocation based on a difference of an estimated time to complete the execution of the activity steps in the execution paths using the outputted computational resource allocations and a realized time to complete execution of the activity steps in the execution paths with the outputted computational resource allocations; and
   training the resource allocation machine learning module to output the adjusted computational resource allocation from the inputs used to produce with the outputted computational resource allocations.

7. The computer program product of claim 6, wherein the determining the adjusted computational resource allocation and the training to output the adjusted computational resource allocation are performed in response to determining that the realized time exceeds the estimated time, and wherein the determining the adjusted computational resource allocation further comprises:
   determining an adjustment percentage based on a difference of the estimated time and the realized time; and
   adjusting the outputted computational resource allocations higher by the adjustment percentage to produce the adjusted computational resource allocation.

8. The computer program product of claim 6, wherein the output from the resource allocation machine learning module further includes a confidence level indicating a likelihood that using the outputted computational resource allocations results in the estimated time and the realized time being within a margin of error of an estimated time to process the activity steps, wherein the training the resource allocation machine learning module further comprises:
   training the resource allocation machine learning module to produce the outputted computational resource allocations from the inputs with a predefined high confidence level in response to a difference of the estimated time and the realized time within the margin of error.

9. The computer program product of claim 6, wherein the output from the resource allocation machine learning module further includes a confidence level indicating a likelihood that using the outputted computational resource allocations results in the estimated time and the realized time being within a margin of error, wherein the operations further comprise:
   training the resource allocation machine learning module to produce the outputted computational resource allocations from the inputs with a lower confidence level than the outputted confidence level for the outputted computational resource allocations in response to the realized time greater than the estimated time by the margin of error.

10. A system for assigning resources to execution paths in a program, comprising:
    a processor; and
    a computer readable storage medium having program instructions embodied therewith that when executed by the processor cause operations, the operations comprising:
       determining execution paths of activity steps in program code to execute in parallel and estimated times to complete execution of the execution paths;
       providing, as inputs to a resource allocation machine learning module, information on the activity steps in the program code, the determined execution paths and the estimated times to complete execution of the execution paths, and a current system load of a system in which the program code is executed, wherein the current system load comprises current used memory and processor resources in the system;
       processing, by the resource allocation machine learning module, the provided inputs to output computational resource allocations for execution paths of activity steps in the program code to execute in parallel, wherein the output computational resource allocations comprise memory and processor resource allocations; and
       allocating the outputted computational resource allocations, including the memory and processor resource allocations, to execute the activity steps in the execution paths in parallel.

11. The system of claim 10, wherein the operations further comprise:
    determining, by the resource allocation machine learning module, groups of execution paths, wherein the execution paths in different of the groups include different arrangements of the activity steps, wherein the execution paths in the groups can be processed in parallel;

determining, by the resource allocation machine learning module, available times in which to complete execution of the execution paths;

determining, by the resource allocation machine learning module, estimated times to complete execution of the execution paths in the groups; and determining, by the resource allocation machine learning module, a selected group of the groups of execution paths to which resource allocation will apply.

12. The system of claim 10, wherein different computational resource allocations are outputted for different of the execution paths, and wherein a critical execution path comprising one of the execution paths that that takes longest to complete is allocated more computational resources than other of the execution paths to minimize a bottleneck of the critical execution path.

13. The system of claim 10, wherein the operations further comprise:

determining an adjusted computational resource allocation based on a difference of an estimated time to complete the execution of the activity steps in the execution paths using the outputted computational resource allocations and a realized time to complete execution of the activity steps in the execution paths with the outputted computational resource allocations; and training the resource allocation machine learning module to output the adjusted computational resource allocation from the inputs used to produce with the outputted computational resource allocations.

14. The system of claim 13, wherein the output from the resource allocation machine learning module further includes a confidence level indicating a likelihood that using the outputted computational resource allocations results in the estimated time and the realized time being within a margin of error, wherein the operations further comprise:

training the resource allocation machine learning module to produce the outputted computational resource allocations from the inputs with a lower confidence level than the outputted confidence level for the outputted computational resource allocations in response to the realized time greater than the estimated time by the acceptable margin of error.

15. A method for assigning resources to execution paths in a program, comprising:

determining execution paths of activity steps in program code to execute in parallel and estimated times to complete execution of the execution paths;

providing, as inputs to a resource allocation machine learning module, information on the activity steps in the program code, the determined execution paths and the estimated times to complete execution of the execution paths, and a current system load of a system in which the program code is executed, wherein the current system load comprises current used memory and processor resources in the system;

processing, by the resource allocation machine learning module, the provided inputs to output computational resource allocations for execution paths of activity steps in the program code to execute in parallel, wherein the output computational resource allocations comprise memory and processor resource allocations; and allocating the outputted computational resource allocations, including the memory and processor resource allocations, to execute the activity steps in the execution paths in parallel.

16. The method of claim 15, further comprising:

determining, by the resource allocation machine learning module, groups of execution paths, wherein the execution paths in different of the groups include different arrangements of the activity steps, wherein the execution paths in the groups can be processed in parallel;

determining, by the resource allocation machine learning module, available times in which to complete execution of the execution paths;

determining, by the resource allocation machine learning module, estimated times to complete execution of the execution paths in the groups; and determining, by the resource allocation machine learning module, a selected group of the groups of execution paths to which resource allocation will apply.

17. The method of claim 15, wherein different computational resource allocations are outputted for different of the execution paths, and wherein a critical execution path comprising one of the execution paths that that takes longest to complete is allocated more computational resources than other of the execution paths to minimize a bottleneck of the critical execution path.

18. The method of claim 15, further comprising:

determining an adjusted computational resource allocation based on a difference of an estimated time to complete the execution of the activity steps in the execution paths using the outputted computational resource allocations and a realized time to complete execution of the activity steps in the execution paths with the outputted computational resource allocations; and training the resource allocation machine learning module to output the adjusted computational resource allocation from the inputs used to produce with the outputted computational resource allocations.

19. The method of claim 18, wherein the output from the resource allocation machine learning module further includes a confidence level indicating a likelihood that using the outputted computational resource allocations results in the estimated time and the realized time being within a margin of error, further comprising:

training the resource allocation machine learning module to produce the outputted computational resource allocations from the inputs with a lower confidence level than the outputted confidence level for the outputted computational resource allocations in response to the realized time greater than the estimated time by the margin of error.

* * * * *